Figure 1:
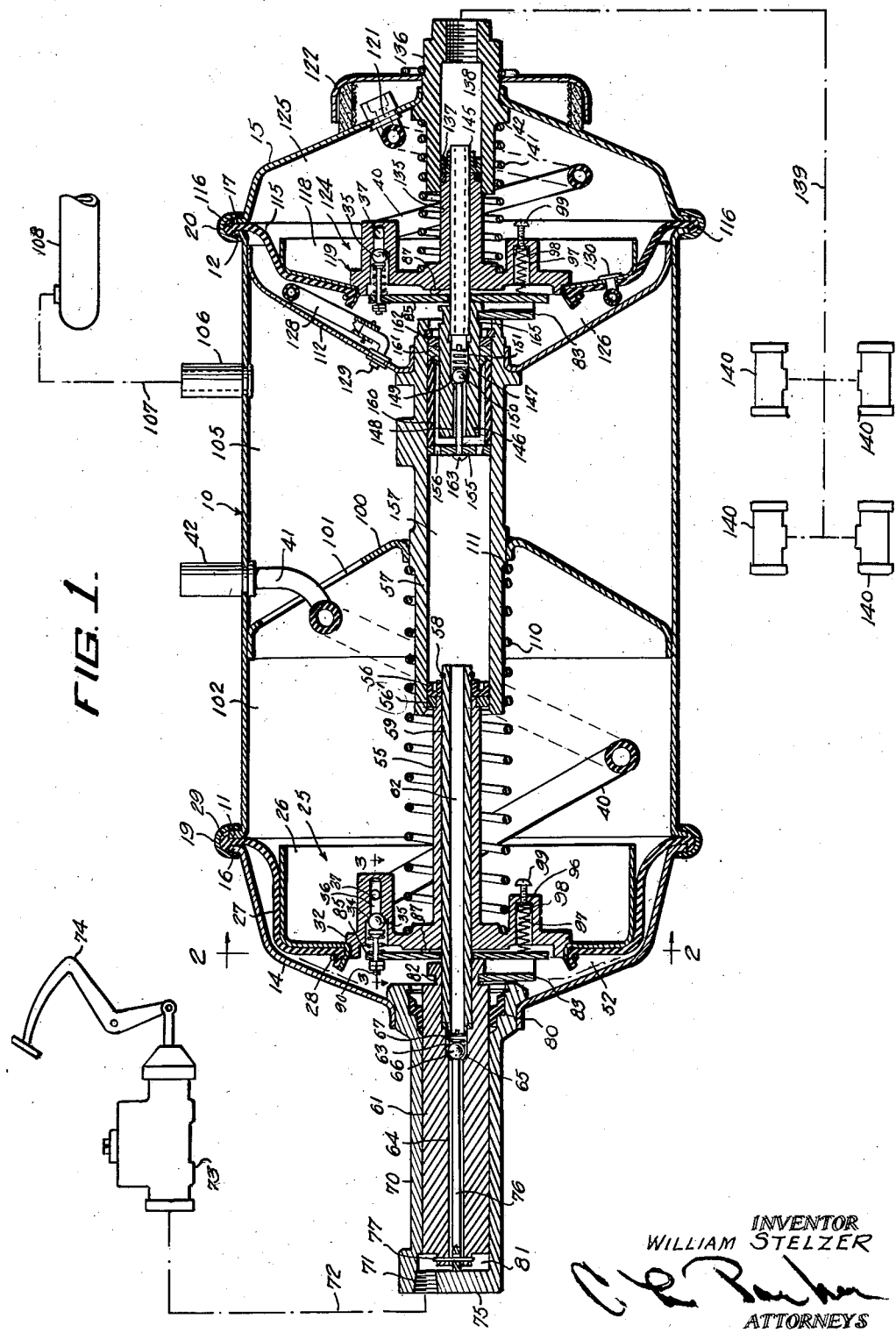

Feb. 26, 1952  W. STELZER  2,587,404
SERIALLY OPERABLE HYDRAULIC BOOSTER MECHANISM
Filed Jan. 28, 1947  2 SHEETS—SHEET 2

INVENTOR
WILLIAM STELZER
ATTORNEYS

Patented Feb. 26, 1952

2,587,404

UNITED STATES PATENT OFFICE 2,587,404

SERIALLY OPERABLE HYDRAULIC BOOSTER MECHANISM

William Stelzer, Summit, N. J.

Application January 28, 1947, Serial No. 724,801

21 Claims. (Cl. 60—54.5)

This invention relates to booster brake mechanisms, and more particularly to a two-stage brake booster device.

In the operation of the hydraulic brake mechanisms of relatively heavy trucks and busses, the movement of the brake shoes into engagement with the drums requires the displacement of a substantial amount of liquid. This initial displacement of liquid can take place with the expenditure of a relatively small amount of work. After the brake shoes have been moved into engagement with the drums, a much smaller displacement of fluid with the expenditure of greater power is required for effecting the braking action.

An important object of the present invention is to provide a two-stage booster mechanism wherein two associated boosters are combined into a single unit, one booster operating at low pressure to displace a comparatively large volume of liquid to move the brake shoes into engagement with the drums and the other booster being thereupon automatically operative for displacing fluid at high pressure to effect the braking action.

A further object is to provide such an apparatus which is highly efficient in operation and consumes less power while performing substantially greater work.

A further object is to provide a booster unit of the type referred to which is comparatively small in size, considering the work to be performed, the device thus lending itself to more economical manufacture.

A further object is to provide a two-stage booster unit of the character referred to wherein the high pressure booster comes into operation automatically at the proper point with relation to operation of the low pressure booster so that the operator feels no appreciable difference in the pedal action as the function of displacing fluid into the brake lines is transferred from the low pressure booster to the high pressure booster.

A further object is to provide such an apparatus which is of such character as to embody therein a vacuum reservoir without the addition of extra structural parts, thus maintaining more than an ample volume of the apparatus under sub-atmospheric pressure conditions at all times.

Other objects and advantages of the invention will become apparent during the course of the following description.

In the drawings I have shown one embodiment of the invention. In this showing

Figure 2:
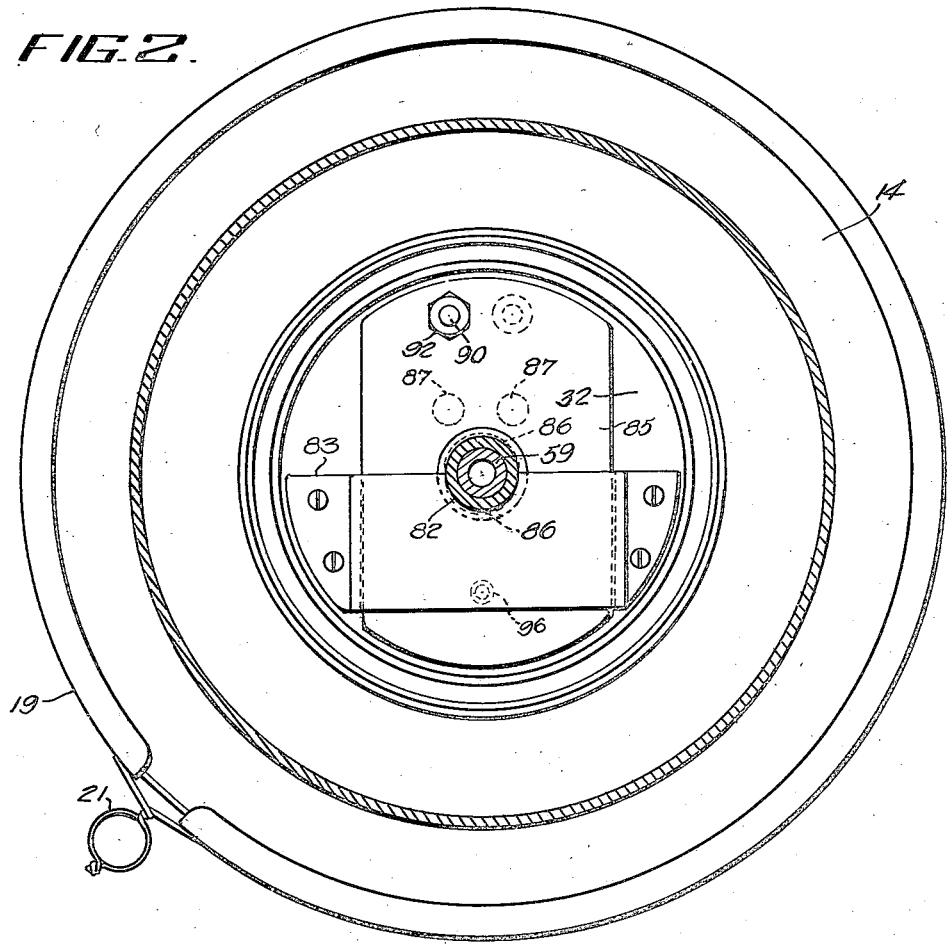
Figure 3:
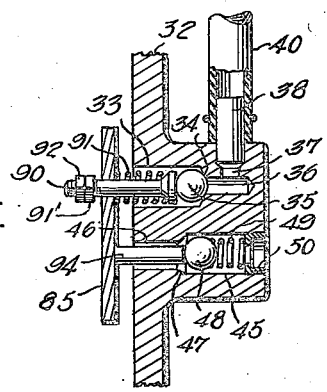

Figure 1 is a central longitudinal sectional view through the booster unit, parts being shown in elevation and the master cylinder and source of vacuum being diagrammatically represented together with their lines of connection to the unit, Figure 2 is a section taken substantially on line 2—2 of Figure 1, and Figure 3 is an enlarged fragmentary sectional view taken substantially on line 3—3 of Figure 1.

Referring to Figure 1, the numeral 10 designates a substantially cylindrical casing having its opposite ends turned outwardly to form annular flanges 11 and 12. The end casing sections 14 and 15 are arranged adjacent the ends of the casing 10 and have out-turned annular flanges 16 and 17 arranged adjacent the flanges 11 and 12 respectively. Clamping rings 19 and 20 surround the pairs of flanges 11 and 16, and 12 and 17 to clamp the casing sections together in a manner more fully described later. A clamping wire 21 (Figure 2) may be used to draw the free ends of the rings 19 and 20 toward each other.

A pressure movable unit indicated as a whole by the numeral 25 is operable in the casing section 14 and in the adjacent end of the cylindrical casing 10. Such pressure movable unit comprises a relatively rigid cup member 26, and a flexible diaphragm 27 has its inner peripheral portion fixed with respect to the cup 26 by a wire 28 or other suitable clamping means. The outer periphery of the diaphragm 27 is enlarged as at 29 and extends between and overhangs the radially outer edges of the flanges 11 and 16. The clamping ring 19 is of channeled cross section to fit the bead 29 and to embrace the flanges 11 and 16, thus clamping these flanges toward each other against the diaphragm to fix the outer periphery of the latter relative to the casings 10 and 14.

A die cast or similar plate 32 is fixed in any suitable manner (not shown) to the cup 26. The plate 32 (Figure 3) is provided with an air passage 33 having a shoulder 34 therein forming a seat engageable by a ball valve 35, the shoulder 34 being arranged between the passage 33 and a smaller passage 36 having a radial port 37.

A sleeve or nipple 38 communicates with the passage 37 and is suitably connected with one end of a rubber or other flexible air hose 40. This hose is spiralled as shown in Figure 1 and the other end of the hose is connected to the inner end 41 of a nipple 42. This nipple forms an air inlet and is preferably provided with any conventional type of air cleaner (not shown).

The plate 32 is also provided with a vacuum passage 45 communicating with a smaller vacuum passage 46 through a valve seat 47 engageable by a ball valve 48. This valve is urged to closed position by a spring 49, one end of this spring engaging the ball 48 and the other end of the spring engaging a spring seat 50. In a manner to be described, the space to the right of the plate 32 is always under sub-atmospheric conditions, and when the valve 48 is open, the space to the left of the plate 32 is also maintained under vacuum. This space constitutes a variable pressure operating chamber indicated by the numeral 52 in Figure 1.

The plate 32 is provided with an axially projecting piston sleeve 55 carrying a suitable packing 56 operable in a cylinder 57. The packing 56 may be backed up by a ring 56$^1$ and may be retained in position by a split ring 58 carried by an inner tubular member 59 arranged in the piston sleeve 55. The tubular member 59 projects beyond the left hand end of the pressure movable unit as viewed in Figure 1 and is arranged in the adjacent end of the piston 61. The passage 62 through the tubular rod 59 communicates with an axial passage 63 in the piston 61, the passage 63 being connected to a smaller axial passage 64 through a valve seat 65. This seat is engageable by a ball valve 66 urged to closed position by a spring 67.

The piston 61 is reciprocable in a cylinder 70 having a suitable port 71 adapted for connection with a line 72 diagrammatcally indicated as being connected to a conventional master cylinder 73 operable by the usual pedal 74. The cylinder 70 is otherwise closed by a head 75 and this head is engageable by a rod 76 when the parts of the apparatus are in the "off" position to unseat the ball 66. Suitable means such as a pin 77 limits longitudinal movement of the rod 76 relative to the piston 61.

The piston 61 operates in suitable packing 80 carried by the inner end of the cylinder 70 and the piston 61 is axially movable toward the right as viewed in Figure 1 upon the displacing of fluid from the master cylinder 73 into the chamber 81 formed in the inlet end of the cylinder 70. The packing 80 prevents the hydraulic fluid from flowing past the piston 61, but such fluid is free to flow through the passages 64 and 63 and through the passage 62 when the ball 66 is unseated.

The inner end of the piston 61 is grooved as at 82 to receive the radially inner edge of a plate 83 fixed to the plate 32 of the pressure movable unit. The groove 82 is slightly wider than the thickness of the plate 83 to permit limited relative movement between the piston 61 and the pressure movable unit 25.

A valve operating plate 85 (Figures 1, 2 and 3) is arranged adjacent the plate 32 and is apertured as at 86 for the passage of the tubular member 59 therethrough. This plate is engageable against a ball 87 carried by the plate 32 and acting as a fulcrum for the plate 85 in a manner to be described. The bottom of the inner end of the piston 61 projects inwardly beyond the top of the inner end of such piston to engage the plate 85 upon inward movement of the piston 61 to rock the plate 85 on the ball 87, the plate 85 thus turning in a counter-clockwise direction.

The plate 85 carries a stem 90 (Figure 3) the inner end of which engages the ball 35. The stem 90 is surrounded by a spring 91 to urge the stem 90 toward the ball 35. The stem 90 is slidable in the plate 85 and its movement toward the right as viewed in Figure 3 is limited by a nut 91' preferably backed up by a jam nut 92. Upon movement of the upper end of the plate 85 toward the left, pressure on the spring 91 is relieved and the valve 35 opens by atmospheric pressure in the passage 36.

The plate 85 also carries a stem 94 engaging the ball valve 48. The plate 85 normally occupies the position shown in Figure 3 maintaining the valve 35 on its seat and holding the valve 48 from its seat so that vacuum exists on both sides of the pressure movable unit 25 as will become more apparent.

Means is preferably employed for determining the force necessary to rock the plate 85 on the ball 87. The plate 32 is provided with a recess 96 in which is arranged a spring 97 engaging the lower end of the plate 85. The spring also engages a spring seat 98 adjustable by a screw 99 to tension the spring 97. This spring tends to urge the lower end of the plate 85 away from the plate 32 to tend to turn the plate 85 in a clockwise direction to hold it in its normal position shown in Figure 3. The force necessary for rocking the plate 85 in a counterclockwise direction will be determined by the adjustment of the tension of the spring 97.

A conical wall 100 is welded or otherwise secured along its peripheral edge to the casing 10 and is provided with an opening 101 through which the nipple 41 projects. The space between the wall 100 and the pressure movable unit 25 constitutes a relatively constant pressure vacuum chamber 102. As indicated above, the normally open valve 48 balances pressures in the chambers 52 and 102 when the device is not in operation, and operation is effected by closing the valve 48 and admitting air into the chamber 52. The motor parts thus far represent the low pressure booster motor of the unit.

The space to the right of the wall 10 constitutes a vacuum chamber 105. A connecting nipple 106 is carried by the casing 10 and communicates with the chamber 105. A suitable conduit diagrammatically indicated by the numeral 107 connects the nipple 106 to a suitable source of subatmospheric pressure such as the intake manifold 108 of the vehicle engine.

The cylinder 57, previously described, is partially supported by the wall 100, the inner periphery of this wall being welded or otherwise secured to the cylinder 57. A spring 110 surrounds the cylinder 57 and engages a shoulder 111 thereon adjacent the wall 100. The other end of the spring 110 is seated against the plate 32 to urge it toward its "off" position.

The cylinder 57 is also supported by another conical wall 112. The inner and outer peripheral edges of this wall are preferably welded respectively to the cylinder 57 and casing 10. The walls 100 and 112 thus fix the axial position of the cylinder 57, and the wall 112 defines one limit of the vacuum chamber 105. This chamber is in free communication at all times with the constant pressure chamber 102 and adds substantially to the volume thereof so that no great increase in pressure in the chamber 102 occurs when the valve 48 opens after the brake has been operated.

The wall 112 constitutes one wall of a high pressure motor which is similar in construction and operation to the motor previously described. The high pressure motor comprises a diaphragm 115 having a peripheral enlargement or bead 116, and this beat and the adjacent flanges 12 and 17 are clamped within the ring 20.

The high pressure motor further comprises a cup 118 carried by a plate 119 similar to the plate 32 previously described and carrying the same valve elements and the parts associated therewith. Since such parts may be identical with those described in connection with the low pressure motor, the same numerals have been employed to designate identical parts and they need not be specifically described in detail. Instead of the air hose 40 of the high pressure motor extending through the casing 10, such hose is connected to a nipple 121 communicating with the atmosphere through the casing section 15, preferably within a suitable conventional air cleaner unit 122. For the purpose of further reference, the pressure movable unit of the high pressure motor has been indicated as a whole by the numeral 124. The space between this unit and the casing section 15 constitutes a relatively constant pressure vacuum chamber 125. The space between the unit 124 and wall 112 constitutes a variable pressure chamber 126. Inasmuch as the vacuum chamber 25 cannot be directly communicated with a source of vacuum, a substantially spiralled hose of rubber or other flexible material 128 is employed, a nipple 129 at one end of this hose connecting it to the chamber 105, and a nipple 130 at the other end of the hose connecting it to the chamber 125. The hose 128 affords constant communication between the chambers 105 and 125, and the valve mechanism of the high pressure motor controls pressures in the chamber 126 in a manner to be described.

The plate 119 carries an axially projecting piston 135 reciprocable in a cylinder 136, the piston 135 being suitably packed as at 137 to generate pressure in the hydraulic fluid in the chamber 138 within the cylinder 136. This chamber is connected by suitable fluid transmission lines indicated diagrammatically by the numeral 139 to the brake cylinders 140 of the vehicle. The air cleaner 122 is supported by the cylinder 136 and a spring 141 is interposed between the plate 119 and a shoulder 142 on the cylinder 136 to urge the pressure movable unit 124 to its "off" position.

A tubular piston rod 145 is slidable into the chamber 139 through the packing 137. The piston 145 is similar to the piston 58 described above and projects into a larger piston 146 to be carried and actuated by such piston. The piston 146 has a passage 147 therein communicating through the bore of the piston rod 145 with the chamber 138. The passage 147 communicates with a smaller passage 148 through a valve seat 149 adapted to be closed by a ball valve 150 urged to closed position by a spring 151.

A plug 155 is positioned in the cylinder 57 as shown in Figure 1 and is apertured as at 156 for the passage of hydraulic fluid therethrough. The space to the left of the piston 146 as viewed in Figure 1 constitutes a low pressure hydraulic chamber 157 from which fluid is forced through the openings 156 upon operation of the low pressure fluid motor. A rubber or similar packing member 160 is arranged in the cylinder 57 to the right of the plug 155 and has its end engaging a flexible packing ring 161 fixed against movement in one direction by a ring 162. A stem 163 is carried by the plug 155 and holds the ball 150 off its seat when the parts of the high pressure motor are in their "off" position.

As is true of the piston 61 previously described, the piston 146 is provided with an annular groove 165 which engages the plate 83 of the pressure responsive unit of the high pressure motor. These two engaging elements have limited relative movement with respect to each other. The bottom of the right hand end of the piston 146 engages the valve operating plate 85 of the high pressure motor in the same manner that the valve operating plate 85 of the low pressure motor is operated by the right hand end of the piston 61.

*Operation*

When the brake pedal 74 is operated, hydraulic fluid is displaced from the master cylinder 73 into the chamber 81. Fluid is free to flow entirely through the booster unit, the ball valves 66 and 150 being normally unseated. The building up of a slight pressure in the system results in movement of the piston 61 toward the right in Figure 1. This movement is due to the fact that while approximately equal pressures exist in the chambers 81 and 157, the area of the piston 61 presented to the fluid in chamber 81 is greater than the area of the piston rod subject to fluid pressure in the chamber 157.

As the piston 61 moves to the right, the ball valve 66 will be almost immediately closed. The pressure movable unit 25 and its piston sleeve 55 will remain stationary for the moment, due to the pressure in the chamber 157 acting on the adjacent end of the piston sleeve 55. Movement of the piston 61 relative to the unit 25 causes the associated valve operating plate 85 to turn in a counterclockwise direction as viewed in Figure 1.

Under the conditions referred to the upper end of the valve operating plate moves to the left as viewed in Figures 1 and 3. The first increment of movement of the upper end of the plate 85 releases the ball valve 48 (Figure 3) for movement to closed position, thus disconnecting the motor chambers 52 and 102, which had been in communication with each other with the pressures therein balanced. As the upper end of the plate 85 moves to the left, pressure on the spring 91 will be progressively released until the force exerted by this spring to tend to seat the ball valve 35 is overbalanced by the atmospheric pressure in the passage 36. Accordingly air will start to flow past the valve seat 34 and into the motor chamber 52 to energize the low pressure motor. The pressure movable unit 25 will then move toward the right in Figure 1 substantially as a unit with the tubular piston rod 59, the latter element and the piston sleeve 55 generating pressure in the chamber 157 to displace fluid therefrom through the axial passages of the high pressure motor and into the brake lines. This operation serves to displace from the chamber 157 the substantial quantity of fluid necessary to move the brake shoes into engagement with the brake drums. The pressure in the chamber 157 will be built up in a predetermined ratio, depending upon the ratio of the area of the piston 61 in the chamber 81 and the area of the tubular piston rod 59 exposed to pressure in the chamber 157.

The spring 91 (Figure 3) of each motor necessarily must exert against the ball 35 a pressure overbalancing the atmospheric pressure tending to unseat such ball, and the cut-in spring 97 supplies the force necessary for the plate 95 to maintain the spring 91 under compression. The spring 97 of the valve mechanism of the high pressure motor is substantially stronger than the spring 97 of the low pressure motor and accordingly substantially greater force must be applied to the valve operating plate 85 of the high pressure motor before energization of the high pressure motor will take place, the low pressure motor being operable at very low pressures in the chamber 81.

Since the displacement of fluid from the chamber 157 by the low pressure motor is quite large, it is obvious that the power of the low pressure motor is correspondingly limited to the generation of relatively low pressures in the chamber 157. At the point where the maximum pressure is generated in the chamber 157 by the low pressure motor, the high pressure motor comes into operation, such maximum pressure in the chamber 157 being sufficient to move the piston 146 and the tubular piston rod 145 toward the right as viewed in Figure 1. While pressures acting oppositely with respect to the piston 146 and rod 145 are equal, the area of the former is greater than the area of the latter, and accordingly the two elements referred to will move toward the right in Figure 1 to rock the valve operating plate 85 of the high pressure motor and thus energize this motor in exactly the same manner that the low pressure motor was energized in accordance with the foregoing description.

Energization of the high pressure motor causes the tubular sleeve 135 to move toward the right in Figure 1 in unison with the tubular piston rod 145. This generates a relatively high pressure in the chamber 138, the pressure generated by the low pressure motor being superimposed upon the pressure generated by the high pressure motor to generate any desired or necessary braking pressures in the chamber 138 and consequently in the brake cylinders 140.

While it is desirable that the high pressure booster should cut in exactly at the time when the low pressure booster has developed its maximum pressure in the chamber 157, an overlap or lag of power cannot be felt by the operator because the booster ratio of the high pressure booster when the high pressure booster cuts in is 1:1 and increases gradually. If the degree of vacuum is very high so that the low pressure unit will cut out after the high pressure unit has cut in, the ratios of the two boosters while both are in operation would be multiplied. However, since the ratio at the point where the high pressure motor becomes effective is 1:1, the overall ratio of the boosters would be affected only slightly. It is preferred that the low pressure booster have a slightly smaller booster ratio than the high pressure booster so that at operating pressures, a smaller manual effort is required.

While the overall booster ratio or pressure multiplication of the two serially connected boosters is equal to the product of their ratios, it is apparent that the resulting booster ratio is similar to that of a single booster because when the booster ratio of the first booster is maximum and the second motor starts to cut in, the ratio of the second one is 1:1. With further increase in pressure the booster ratio of the first booster goes down as the ratio of the second unit goes up. Due to the high cut-in effected by spring 97 of the second motor the maximum pressure multiplication of the second booster is smaller than the ratio of the control piston 145—146, but this is compensated again as the pressure is multiplied by the booster ratio of the low pressure booster.

From the foregoing it will be apparent that the present apparatus is highly desirable and efficient for use particularly with relatively heavy vehicles, particularly those having more than four wheels, since the volume of fluid which must be displaced to initially move the brake shoes into engagement with the drums is quite substantial. To displace fluid with a high pressure booster would require a booster of impracticable length since the high pressure piston thereof would have to be relatively small and accordingly would be required to have a travel of great length. With the present apparatus, the low pressure booster with its relatively large piston area in the chamber 157 compared with the cross-sectional area of the chamber 138, the low pressure booster is adapted to displace substantial volumes of hydraulic fluid to initially engage the brake shoes with the drums. It is not until such initial engagement is established that the high pressure booster comes into operation, and the latter booster operates efficiently with a short piston travel to generate maximum braking pressures.

The releasing of the apparatus for movement of the parts back to normal position takes place in accordance with individual boosting devices of this general type. A releasing of the pedal pressure reduces forces acting on the piston 61 in the chamber 81, whereupon the spring 97 restores the valve mechanism of the low pressure booster to the normal positions shown in Figure 3. The admission of air into the chamber 52 is cut off and communication is reestablished past the ball valve 48 between the chambers 52 and 102. The force of the spring 110 and fluid pressure in the chamber 157 promptly moves the parts of the low pressure booster to the "off" position.

A reduction in pressure in the chamber 157 below the pressure necessary for actuation of the valves of high pressure booster results in the returning of such valves to their normal position, corresponding to the positions shown in Figure 3. The high pressure booster is thus deenergized in exactly the same manner as the low pressure booster and the parts returned promptly to normal position.

Just prior to the returning of the pistons 61 and 146 to their fully "off" positions, the rods 76 and 163 will engage and unseat the respective valves 66 and 150. Communication is thus reestablished throughout the length of the unit between the chambers 81 and 138, and hydraulic fluid from the master cylinder is free to flow from the unit to replace any fluid which may have leaked from the system in the previous operation of the brakes.

Attention is particularly invited to the fact that each of the two motors employs a valve mechanism having a spring forming a part thereof or associated therewith for determining the cut-in point of the motor in accordance with the hydraulic pressure affecting the valve-operating piston. In the present instance, the cut-in device is the spring 97 of each motor, these springs determining the resistance offered against valve operating movement of the plates 85 of the two motors. The spring 97 of the low pressure motor is relatively weak and accordingly the associated plate 85 is operable by relatively low hydraulic pressures in the master cylinder and in the chamber 81. The spring 97 of the high pressure motor is so much stronger and requires substantially greater hydraulic pressure in the chamber 157 in order for the values of the high pressure motor to be operated. Accordingly the high pressure motor does not come into operation until after the low pressure motor has completely or substantially completely performed its function, namely of displacing a substantial quantity of hydraulic fluid into the brake lines to initially engage the brake shoes with the drums.

I claim:

1. A hydraulic system comprising a pair of fluid pressure motors, a low pressure hydraulic chamber, means movable by fluid introduced into such chamber for energizing one of said motors, a second hydraulic chamber, a fluid displacing device operable by said first-named motor for generating pressure in said second chamber, means movable by fluid pressure in said second chamber for energizing the other motor, said last-named means including a device for rendering energization of said other motor dependent upon pressure in said second chamber higher to a predetermined extent than pressure in said low pressure chamber, a high pressure hydraulic chamber, and means operable by said other motor for generating a relatively high pressure in said high pressure chamber.

2. A hydraulic system comprising a first fluid pressure motor and a second fluid pressure motor, a low pressure hydraulic chamber, a plunger in said low pressure chamber, means operable by said plunger for energizing said first motor, a second hydraulic chamber, a first piston movable in said second chamber and operable by said first motor to generate pressure in said second chamber, a second plunger in said second chamber movable by fluid pressure therein, means operable by said second plunger for energizing said second motor, a high pressure chamber, and a second position connected to said second motor and operable in said high pressure chamber, said second piston being of smaller diameter than said first piston to generate a higher pressure in said high pressure chamber than in said second chamber.

3. A hydraulic system comprising a first fluid pressure motor and a second fluid pressure motor, a hydraulic chamber, a first plunger operable in said chamber by hydraulic fluid introduced thereinto, a valve mechanism operable by said plunger for energizing said first motor, a second hydraulic chamber, a first piston operable in said second chamber and connected to said first motor, said plunger projecting through said piston to cooperate with the latter in generating hydraulic pressures in said second chamber, a second plunger in said second chamber movable by fluid pressure generated therein, a valve mechanism operable by said second plunger for energizing said second motor, a high pressure hydraulic chamber, and a second piston connected to said second motor and movable in said high pressure chamber, said second plunger projecting through said second piston to cooperate therewith in generating relatively high pressures in said high pressure chamber.

4. A hydraulic system comprising a first fluid pressure motor and a second fluid pressure motor, a low pressure hydraulic chamber, a first plunger movable in said chamber upon the introduction of hydraulic fluid thereinto, said first motor having a pair of elastic fluid pressure chambers and a pressure movable unit therebetween, means operable by said plunger for establishing differential pressures in said elastic fluid pressure chambers to energize said first motor, a second hydraulic chamber, a piston connected to said pressure movable unit and operable in said second chamber to generate hydraulic pressures therein, a second plunger movable by hydraulic pressure in said second chamber, said second motor having a pair of elastic fluid pressure chambers and a pressure movable unit therebetween, means operable by said second plunger for establishing differential pressures in the elastic fluid pressure chambers of said second motor to effect movement of the pressure movable unit thereof, last-named means including a device for rendering such means operable only when the pressure in said second chamber is higher to a predetermined extent than pressure in said low pressure chamber, a high pressure hydraulic chamber, and a second piston connected to the pressure movable unit of said second motor and operable in said high pressure chamber.

5. A hydraulic system comprising a first elastic fluid pressure motor and a second elastic fluid pressure motor, a low pressure hydraulic chamber, a plunger movable in said chamber upon the introduction of fluid thereinto, said motor having a pair of elastic fluid pressure chambers and a pressure movable unit therebetween, a valve mechanism carried by said pressure movable unit, control means connected between said plunger and said valve mechanism to energize said first motor to cause said pressure movable unit to partake of a follow-up action relative to said plunger, a second hydraulic chamber, a first piston connected to said pressure movable unit and operable in said second chamber, said plunger projecting through said piston to cooperate therewith to generate hydraulic pressures in said second chamber, a second plunger movable by hydraulic pressure in said second chamber, said second motor having a pair of elastic fluid pressure chambers and a pressure movable unit therebetween, valve mechanism carried by the pressure movable unit of said second motor, means connecting said second plunger to the valve mechanism of said second motor for energizing said second motor to cause it to partake of a follow-up action relative to said second plunger, a high pressure hydraulic chamber, and a second piston connected to the pressure movable unit of said second motor and operable in said high pressure chamber, said second plunger projecting through said second piston to cooperate therewith in generating pressures in said high pressure chamber, said high pressure chamber being of such cross-sectional area and said second motor being of such capacity relative to the cross-sectional area of said second chamber and the capacity of said first motor as to generate a substantially higher pressure in said high pressure chamber than is generated in said second chamber.

6. A hydraulic brake system comprising a manually operable master cylinder, a plurality of brake cylinders operable by hydraulic fluid pressure, and a hydraulic booster unit between said master cylinder and said brake cylinder comprising a low pressure hydraulic chamber communicating with the master cylinder, means movable by fluid introduced into said low pressure chamber, a first fluid pressure motor energizable by movement of said means, a second hydraulic chamber, fluid displacing means movable in said second chamber upon operation of said motor for generating pressure in said second chamber, a second pressure motor, means movable by pressure generated in said second chamber for energizing said second motor, last-named means including a device for rendering such means operable only when the pressure in said second chamber is higher to a predetermined extent than pressure in said low pressure chamber, a high pressure hydraulic chamber communicating with the brake cylinders, and pressure generating means in said high pressure chamber connected to said second motor to be operated thereby.

7. A hydraulic brake system comprising a manually operable master cylinder, a plurality of brake cylinders operable by hydraulic pressure, and a hydraulic booster unit between said master cylinder and said brake cylinders comprising a first fluid pressure motor and a second fluid pressure motor, a low pressure hydraulic chamber communicating with the master cylinder, a plunger in said low pressure chamber, means operable by said plunger for energizing said first motor, a second hydraulic chamber, a first piston movable in said second chamber and operable by said first motor to generate pressure in said second chamber, a second plunger in said second chamber movable by fluid pressure therein, means operable by said second plunger for energizing said second motor, a high pressure chamber communicating with the brake cylinders, and a second piston connected to said second motor and operable in said high pressure chamber, said second piston being of smaller diameter than said first piston to generate a higher pressure in said high pressure chamber than in said second chamber.

8. A hydraulic brake system comprising a manually operable master cylinder, a plurality of brake cylinders, and a hydraulic booster unit between said master cylinder and said brake cylinders comprising a first fluid pressure motor and a second fluid pressure motor, a low pressure hydraulic chamber connected with said master cylinder, a first plunger operable in said chamber by hydraulic fluid introduced thereinto from said master cylinder, a valve mechanism operable by said plunger for energizing said first motor, a second hydraulic chamber, a first piston operable in said second chamber and connected to said first motor, said plunger projecting through said piston to cooperate with the latter in generating hydraulic pressures in said second chamber, a second plunger in said second chamber movable by fluid pressure generated therein, a valve mechanism operable by said second plunger for energizing said second motor, a high pressure hydraulic chamber communicating with the brake cylinders, and a second piston connected to said second motor and movable in said high pressure chamber, said second plunger projecting through said second piston to cooperate therewith in generating relatively high pressures in said high pressure chamber.

9. A hydraulic brake system comprising a manually operable master cylinder, a plurality of brake cylinders, and a hydraulic booster unit between said master cylinder and said brake cylinders comprising a first fluid pressure motor and a second fluid pressure motor, a low pressure hydraulic chamber communicating with said master cylinder, a first plunger movable in said chamber upon the introduction of hydraulic fluid thereinto from said master cylinder, said first motor having a pair of elastic fluid pressure chambers and a pressure movable unit therebetween, means operable by said plunger for establishing differential pressures in said elastic fluid chambers to energize said first motor, a second hydraulic chamber, a first piston connected to said pressure movable unit and operable in said second chamber to generate hydraulic pressures therein, a second plunger movable by hydraulic pressures in said second chamber, said second motor having a pair of elastic fluid pressure chambers and a pressure movable unit therebetween, means operable by said second plunger for establishing differential pressures in the elastic fluid chambers of said second motor to effect movement of the pressure movable unit thereof, said last-named means including a resilient device for delaying energization of said second motor until said first piston has established in said second chamber a pressure higher to a predetermined extent than the pressure in said low pressure chamber, a high pressure chamber communicating with the wheel cylinders, and a second piston connected to the pressure movable unit of said second motor and operable in said high pressure chamber.

10. A hydraulic brake system comprising a manually operable master cylinder, a plurality of brake cylinders, and a hydraulic booster unit between said master cylinder and said wheel cylinders comprising a first fluid pressure motor and a second fluid pressure motor, a low pressure hydraulic chamber, a plunger movable in said chamber upon the introduction of hydraulic fluid thereinto from said master cylinder, said first motor having a pair of elastic fluid pressure chambers and a pressure movable unit therebetween, a second hydraulic chamber, a piston connected to said pressure movable unit and operable in said second chamber, said plunger projecting through said piston, valve mechanism operable by said plunger for energizing said first motor to cause said piston to partake of a follow-up action relative to said plunger, a second plunger movable by hydraulic pressure in said second chamber, said second motor having a pair of elastic fluid pressure chambers and a pressure movable unit therebetween, a high pressure hydraulic chamber communicating with the wheel cylinders, a second piston operable in said high pressure chamber and connected to the pressure movable unit of said second motor, said second plunger projecting through said second piston into said high pressure chamber, and a valve mechanism operable by said second plunger for energizing said second motor to cause said second piston to partake of a follow-up action relative to said plunger whereby said second piston and said second plunger cooperate to generate relatively high pressures in said high pressure chamber.

11. A hydraulic system comprising a pair of axially aligned fluid pressure motors each having a pair of elastic fluid chambers and a pressure movable unit therebetween, an intermediate elastic fluid pressure chamber between the adjacent elastic fluid pressure chambers of the two motors and adapted for connection with a source of subatmospheric pressure, said intermediate chamber directly communicating with the adjacent elastic fluid chamber of one motor whereby the latter chamber constitutes a low pressure chamber of its motor, a conduit connecting said intermediate chamber to the remote elastic fluid chamber of the other motor, a primary hydraulic chamber coaxial with said motors, a plunger in said primary chamber, means operable by said plunger upon introduction of hydraulic fluid into said primary chamber for connecting the other elastic fluid pressure chamber of the first named motor to a source of atmospheric pressure, a second hydraulic chamber coaxial with said motors, a piston in said second hydraulic chamber connected to the pressure movable unit of the first mentioned motor, a second plunger in said second hydraulic chamber movable by pressure generated by movement of said piston, means operable by said second plunger for admitting atmospheric pressure into the other elastic fluid chamber of said other motor, a high pressure hydraulic chamber coaxial with said motors, and a piston in said high pressure hydraulic chamber connected to the pressure movable unit of said other motor.

12. Apparatus constructed in accordance with claim 11 wherein said first plunger projects axially through said first piston to cooperate therewith in generating hydraulic pressures in said second hydraulic chamber, said second plunger projecting axially through said second piston to cooperate with the latter in generating hydraulic pressures in said high pressure hydraulic chamber.

13. A hydraulic booster unit comprising a first fluid pressure motor and a second fluid pressure motor each comprising a head, a wall and a pressure movable unit therebetween defining with said head and wall a pair of elastic fluid chambers, a cylindrical casing extending between and fixing said motors to each other in axial alignment, said casing and said walls defining an auxiliary chamber adapted for fixed connection with a source of subatmospheric pressure, one of said walls having an opening therethrough to connect said auxiliary chamber to the adjacent elastic fluid pressure chamber, a conduit connecting said auxiliary chamber to the remote elastic fluid pressure chamber of the other motor, a valve mechanism carried by each pressure movable unit and normally connecting the elastic fluid pressure chambers of each motor, a low pressure hydraulic chamber, means in said low pressure chamber connected to the valve mechanism of said first motor and operable upon the introduction of hydraulic fluid into said low pressure chamber for disconnecting the elastic fluid pressure chambers of such motor and connecting the other chamber of such motor to the atmosphere, a second hydraulic chamber, means forming a part of the pressure movable unit of said first motor for generating hydraulic pressure in said second chamber, means in said second chamber operable by fluid pressure therein and connected to the valve mechanism of said second motor to disconnect the elastic fluid pressure chambers thereof from each other and to connect the other such chamber to the atmosphere, a high pressure hydraulic chamber, and means forming a part of the pressure movable unit of said second motor and operable in said high pressure chamber for generating relatively high pressures therein.

14. A hydraulic booster unit comprising a first fluid pressure motor and a second fluid pressure motor each comprising a head, a wall and a pressure movable unit therebetween defining with said head and wall a pair of elastic fluid chambers, a cylindrical casing extending between and fixing said motors to each other in axial alignment, said casing and said walls defining an auxiliary chamber adapted for fixed connection with a source of subatmospheric pressure, one of said walls having an opening therethrough to connect said auxiliary chamber to the adjacent elastic fluid pressure chamber, a conduit connecting said auxiliary chamber to the remote elastic fluid pressure chamber of the other motor, a valve mechanism carried by each pressure movable unit and normally connecting the elastic fluid pressure chambers of each motor, a low pressure hydraulic chamber, a plunger in said low pressure chamber connected to the valve mechanism of said first motor and movable by hydraulic fluid in said low pressure chamber for disconnecting the elastic fluid pressure chambers of such motor and connecting the other chamber of such motor to the atmosphere, a second hydraulic chamber, a piston carried by the pressure movable unit of said first motor and operative in said second chamber, said plunger projecting through said piston to cooperate therewith in generating hydraulic pressure in said second chamber, a second piston in said second chamber movable by hydraulic pressure therein and connected to the valve mechanism of said second motor to disconnect the chambers thereof from each other and open the other chamber of said second motor to the atmosphere, a high pressure hydraulic cylinder, and a second piston carried by the pressure movable unit of said second motor, said second plunger projecting through said second piston to cooperate therewith in generating relatively high pressures in said high pressure chamber.

15. A hydraulic system comprising a pair of fluid pressure motors each having a valve mechanism operable for energizing it, a low pressure hydraulic chamber, means movable by fluid introduced into such chamber for energizing one of said motors, the valve mechanism of such motor including a spring for predetermining the force necessary to operate the valve mechanism of such motor, a second hydraulic chamber, a fluid displacing device operated by said one motor for generating pressure in said second chamber, means movable by fluid pressure in said second chamber for energizing the other motor, the valve mechanism for said other motor including a spring for predetermining the pressure in said second chamber necessary for operating the valve mechanism of said other motor for energizing it, said second spring being substantially stronger than said first spring, a high pressure hydraulic chamber, and means operable by said other motor for generating a relatively high pressure in said high pressure chamber.

16. A hydraulic system comprising a first fluid pressure motor and a second fluid pressure motor each having a valve mechanism operable for energizing it, a low pressure hydraulic chamber, a plunger in said low pressure chamber, means operable by said plunger for operating the valve mechanism of said first motor, the valve mechanism of said first motor having a spring operable by said means for predetermining the pressure in said low pressure chamber necessary for operating the valve mechanism of said first motor, a second hydraulic chamber, a first piston movable in said second chamber and operable by said first motor to generate pressure in said second chamber, a second plunger in said second chamber movable by fluid pressure therein, means operable by said second plunger for operating the valve mechanism of said second motor, the valve mechanism of said second motor including a spring resisting operation of such valve mechanism to predetermine the pressure in said second chamber necessary to operate such valve mechanism and said spring being substantially stronger than said first-named spring, a high pressure chamber, and a second piston connected to said second motor and operable in said high pressure chamber.

17. A hydraulic brake system comprising a manually operable master cylinder, a plurality of brake cylinders operable by hydraulic fluid pressure, and a hydraulic booster unit between said master cylinder and said brake cylinders comprising a low pressure hydraulic chamber communicating with the master cylinder, means movable by fluid introduced into said low pressure chamber, a first fluid pressure motor having a valve mechanism operable by movement of said means to energize such motor, said valve mechanism having a spring acting against movement of said means to predetermine the hydraulic pressure in said low pressure chamber necessary for operating the valve mechanism of said first motor, a second hydraulic chamber, fluid pressure generating means in said second chamber connected to said first motor to be operated thereby, a second fluid pressure motor having a valve mechanism operable for energizing it, means movable by pressure generated in said second chamber for operating the valve mechanism of said second motor, the valve mechanism of said second motor having a spring stronger than said first-named spring and resisting movement of said last-named means to predetermine pressure in said second chamber necessary for operating the valve mechanism of said second motor, a high pressure hydraulic chamber communicating with the brake cylinders, and pressure generating means in said high pressure chamber connected to said second motor to be operated thereby.

18. A hydraulic system comprising a pair of motors, a low pressure hydraulic chamber, means movable by fluid introduced into such chamber for energizing one of said motors, a second hydraulic chamber, a fluid displacing device operable by said first-named motor for generating pressure in said second chamber, means in said second chamber movable by pressure generated therein by said fluid displacing device for energizing the other motor, said last-named means including a device for rendering energization of said other motor dependent upon pressure in said second chamber higher to a predetermined extent than pressure in said low pressure chamber, a high pressure hydraulic chamber, means operable by said other motor for generating a relatively high pressure in said high pressure chamber, said second chamber being in communication with said high pressure chamber when said other motor is deenergized, and means for closing such communication upon energization of said second motor.

19. A hydraulic system comprising a first motor and a second motor, a low pressure hydraulic chamber, a plunger in said low pressure chamber, a first control means operable by said plunger for energizing said first motor, a second hydraulic chamber, a first piston movable in said second chamber by said first motor to generate pressure therein, a second plunger in said second chamber movable by fluid pressure therein, a second control means operable by said second plunger for energizing said second motor, a high pressure chamber, a second piston in said high pressure chamber operable by said second motor, and opposing means tending to oppose movement of each of said plungers, the opposing means for said second plunger being stronger than the opposing means for said first plunger whereby the pressure in said second chamber necessary to energize said second motor will be higher than the pressure in said low pressure chamber necessary to energize said first motor.

20. A hydraulic system comprising a first motor and a second motor, a low pressure hydraulic chamber, a plunger in said low pressure chamber, a first control means operable by said plunger for energizing said first motor, a second hydraulic chamber, a first piston movable in said second chamber by said first motor to generate pressure therein, a second plunger in said second chamber movable by fluid pressure therein, a second control means operable by said second plunger for energizing said second motor, a high pressure chamber, a second piston in said high pressure chamber operable by said second motor, opposing means tending to oppose movement of each of said plungers, the opposing means for said second plunger being stronger than the opposing means for said first plunger whereby the pressure in said second chamber necessary to energize said second motor will be higher than the pressure in said low pressure chamber necessary to energize said first motor, said second chamber having communication with said high pressure chamber when said second motor is deenergized, and means for closing such communication upon energization of said second motor.

21. In a hydraulic system having a master cylinder operated by the operator and wheel cylinders to apply the brakes, a power-operated primary booster arranged to receive hydraulic fluid transmitted from said master cylinder and to produce a boosted pressure, a power-operated secondary booster arranged to receive hydraulic fluid under boosted pressure from said primary booster to boost the hydraulic fluid to a still higher pressure and to transmit it to the wheel cylinders, control means to energize said primary booster in response to the initial pressure produced by said master cylinder to generate a proportional boosted hydraulic pressure, control means to proportionately energize said secondary booster in response to the boosted pressure produced by said primary booster, and means yieldingly opposing said last-named control means to delay the energization of said secondary booster until said primary booster has been energized to a predetermined extent.

WILLIAM STELZER.

REFERENCES CITED

The following references are of record in the file of this patent:

UNITED STATES PATENTS

| Number | Name | Date |
| --- | --- | --- |
| 2,032,185 | Sciaky | Feb. 25, 1936 |
| 2,305,638 | Rockwell | Dec. 22, 1942 |
| 2,415,035 | Penrose | Jan. 28, 1947 |

FOREIGN PATENTS

| Number | Country | Date |
| --- | --- | --- |
| 23,596 | Great Britain | Oct. 25, 1911 |